United States Patent [19]
Lamy

[11] 4,069,685
[45] Jan. 24, 1978

[54] METHOD OF AND DEVICE FOR FORMING A FLUIDTIGHT DUCT TRANSITION THROUGH A WALL

[75] Inventor: Jacques Edouard Lamy, Fontenay-aux-Roses, France

[73] Assignee: C. G. DORIS (Campagnie Generale pour les Developpements Operationnels des Richesses Sous-marines), Paris, France

[21] Appl. No.: 741,526

[22] Filed: Nov. 12, 1976

Related U.S. Application Data

[63] Continuation-in-part of Ser. No. 573,759, May 1, 1975.

[30] Foreign Application Priority Data

May 17, 1974 France .................................. 74 17243
Aug. 13, 1976 France .................................. 76 24777

[51] Int. Cl.$^2$ ......................... F16L 1/04; E02D 27/38
[52] U.S. Cl. ......................................... 61/107; 61/86; 61/101
[58] Field of Search .................. 61/72.3, 69 R, 81, 83, 61/86–104, 105; 166/.5, .6; 285/18, 24, 27; 277/34, 34.3, 34.6

[56] References Cited

U.S. PATENT DOCUMENTS

| | | | |
|---|---|---|---|
| 2,114,038 | 4/1938 | Updegraff | 61/83 |
| 3,032,835 | 5/1962 | Saar et al. | 61/83 X |
| 3,482,410 | 12/1969 | Roesky et al. | 61/69 R X |
| 3,585,805 | 6/1971 | Vincent | 61/69 R X |
| 3,795,115 | 3/1974 | Bergquist et al. | 61/111 |
| 3,834,169 | 9/1974 | Abbott | 61/111 |
| 3,899,894 | 8/1975 | Liautaud | 61/111 |

FOREIGN PATENT DOCUMENTS

| | | | |
|---|---|---|---|
| 8,594 of | 1903 | United Kingdom | 61/83 |
| 1,112,849 | 5/1968 | United Kingdom | 61/83 |

*Primary Examiner*—Dennis L. Taylor
*Attorney, Agent, or Firm*—Wigman & Cohen

[57] ABSTRACT

In order to pass a duct across a wall between two spaces in which different pressures prevail, there is formed in said wall a passage which is temporarily closed off by means of a panel applied in position by the pressure, whereafter, at the time at which the duct is to be passed across the wall, the pressures in the two spaces are equalized making it possible to remove the temporary closure, the duct is introduced through the passage, a temporary seal between the passage and the exterior of the duct is formed by inflating a pair of inflatable seals, the pressure difference between the two spaces is restored, and a final seal between the passage and the exterior of the duct is created by injecting an adhesive cement between and into the inflatable seals.

8 Claims, 9 Drawing Figures

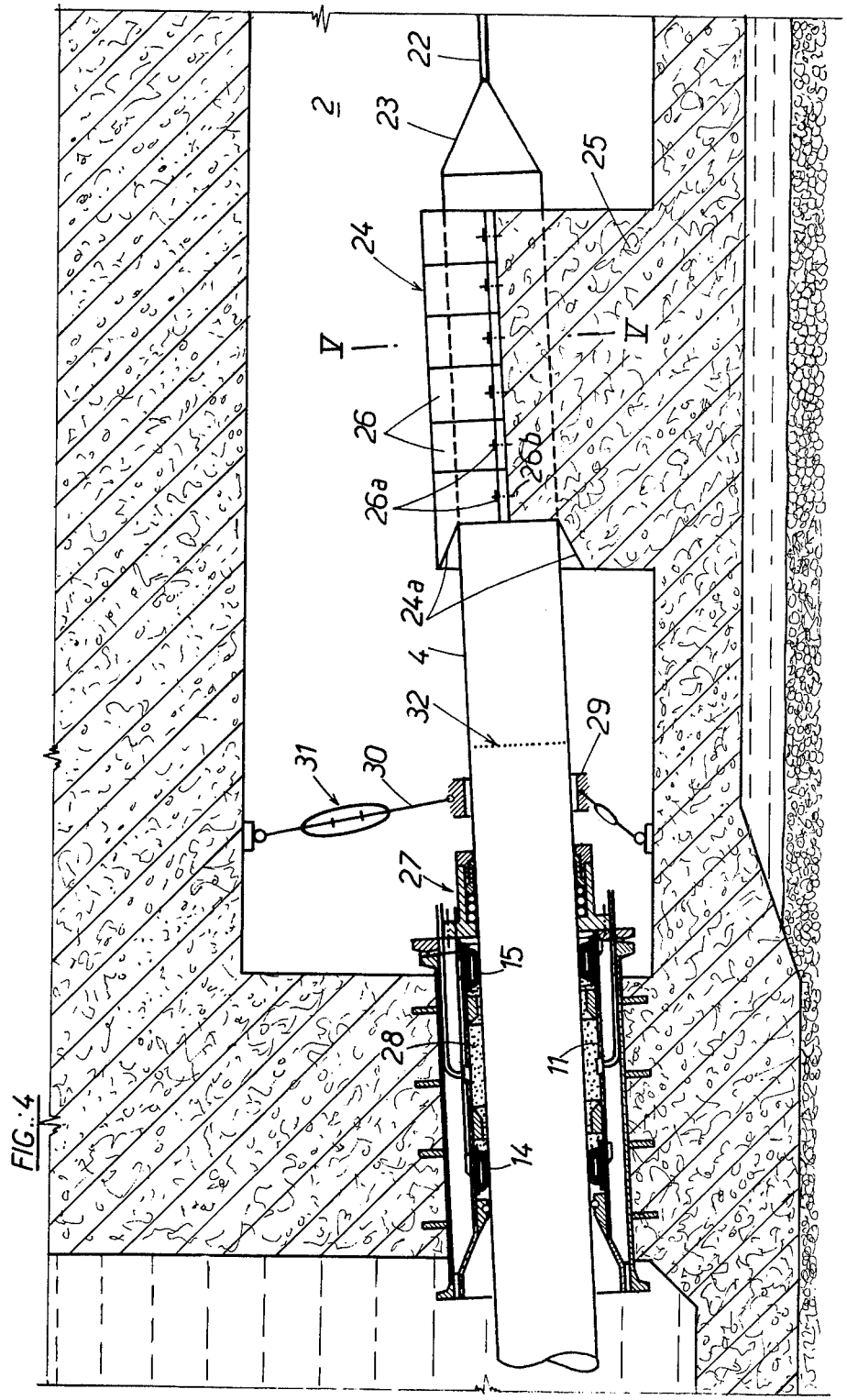

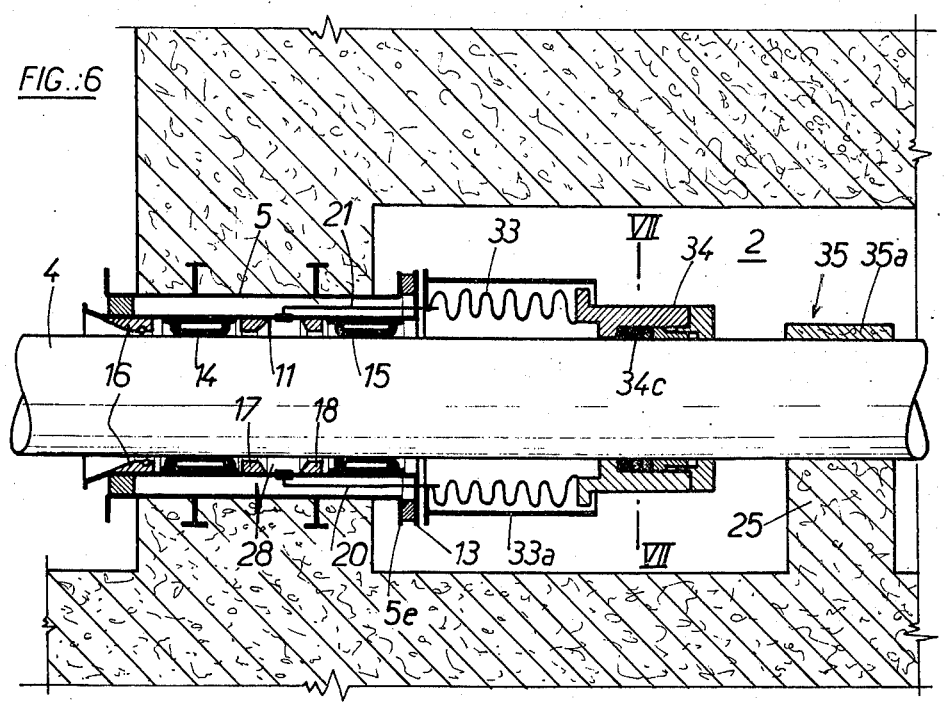
FIG.:6
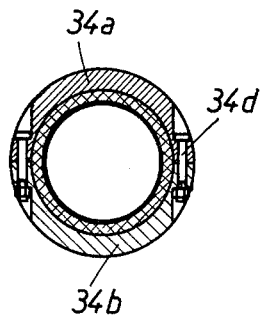
FIG.:7
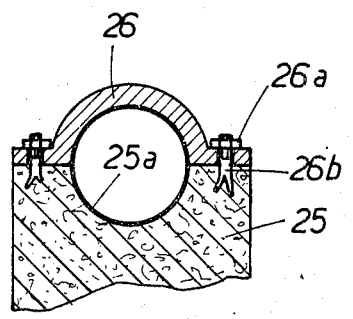
FIG.:5

METHOD OF AND DEVICE FOR FORMING A FLUIDTIGHT DUCT TRANSITION THROUGH A WALL

This is a continuation-in-part of my copending U.S. patent application Ser. No. 573,759 filed on May 1, 1975.

The present invention relates to the execution of a fluidtight duct transition across a wall separating two spaces which are at different pressures, the term "duct" being intended in the broadest possible sense and covering, for example, a pipe as well as an electrical or telecommunications line. The invention is applicable in particular to the situation in which a submarine pipeline enters a watertight chamber located at the bottom of the sea and communicating with the atmosphere through a watertight duct.

For example, in U.S. Pat. No. 3,938,343, a platform structure has been described which is designed to rest under its own weight upon the sea bed through the medium of a base forming the foot of a tower surmounting an emergent superstructure, and comprising a strong watertight barrel or shaft which communicates with one or more watertight radial tunnels located in the base in proximity of the sea bed, the ends of which tunnels are closed off from the sea by watertight walls. These tunnels are designed to make it possible to carry out, in the dry, connections between submarine pipelines and pipes located inside the platform. In this particular example, an object of the present invention is to enable a pipeline to penetrate into a tunnel across the terminal wall thereof, and to re-establish the watertightness of said wall in order that the piping connections can then be carried out in the dry, inside the tunnels.

More generally, the object of the present invention is a method of executing a duct transition across a wall, between a space in which a certain pressure prevails (which space will hereinafter be referred to as the first space) and a space which is normally at a pressure differing from the first pressure (which space will hereinafter be called the second space), whilst preserving the fluidtightness of the wall.

In my above mentioned co-pending U.S. Patent Application of which the present patent application is a continuation-in-part, are described a method and a device in which a passage through the wall is shut adjacent the first space by a temporary closure means which is applied against a rim of the passage, then the second space is filled with a fluid at a pressure substantially equal to the first pressure and the temporary closure means is removed, then the duct is introduced through the passage and through annular seal means placed in the passage, then the seal means are clamped against the duct, then the fluid is evacuated from the second space, and eventually the passage is finally sealed around the duct. In the embodiment described in the above mentioned co-pending Patent Application, the annular seal means comprises a pair of inflatable seals arranged in axially spaced relation in the passage, and the final sealing comprises injecting an adhesive cement (for example an epoxy resin) between the inflated seals, and clamping adjacent the second space a mechanically clampable seal comprising a stuffing-box.

In accordance with the present invention, a first improvement comprises injecting an adhesive cement between the inflatable seals and into the inflatable seal. A second improvement comprises sealing the passage around the duct, adjacent the first space by a pressure-differential method which utilises the difference between the first pressure and the pressure in the passage, this sealing being preferably ejected just after introducing the duct through the passage, that is to say before inflating the inflatable seals. A third improvement is to substitute the stuffing-box by a mechanically clampable seal comprising an annular member formed of an elastomeric material which is compressed between two rigid (for example metal) members one of which is fastened sealingly to the wall of the passage.

The description which now follows in relation to the attached drawings given by way of non-limitative examples, will indicate the advantages of the invention and the method by which the latter is to be performed, all the features contained in the description and in the drawings forming part of said invention as defined in the claims. In the drawings:

FIG. 4 is a view similar to that of FIG. 3, but schematic in form and on a smaller scale, illustrating the cutting and connection of the end of the pipeline;

FIG. 5 is a view in section on the line V—V of FIG. 4;

FIG. 6 is a view similar to that of FIG. 4, illustrating a modification;

FIG. 7 is a schematic sectional view taken on the line VII—VII of FIG. 6; and

Figure 1:
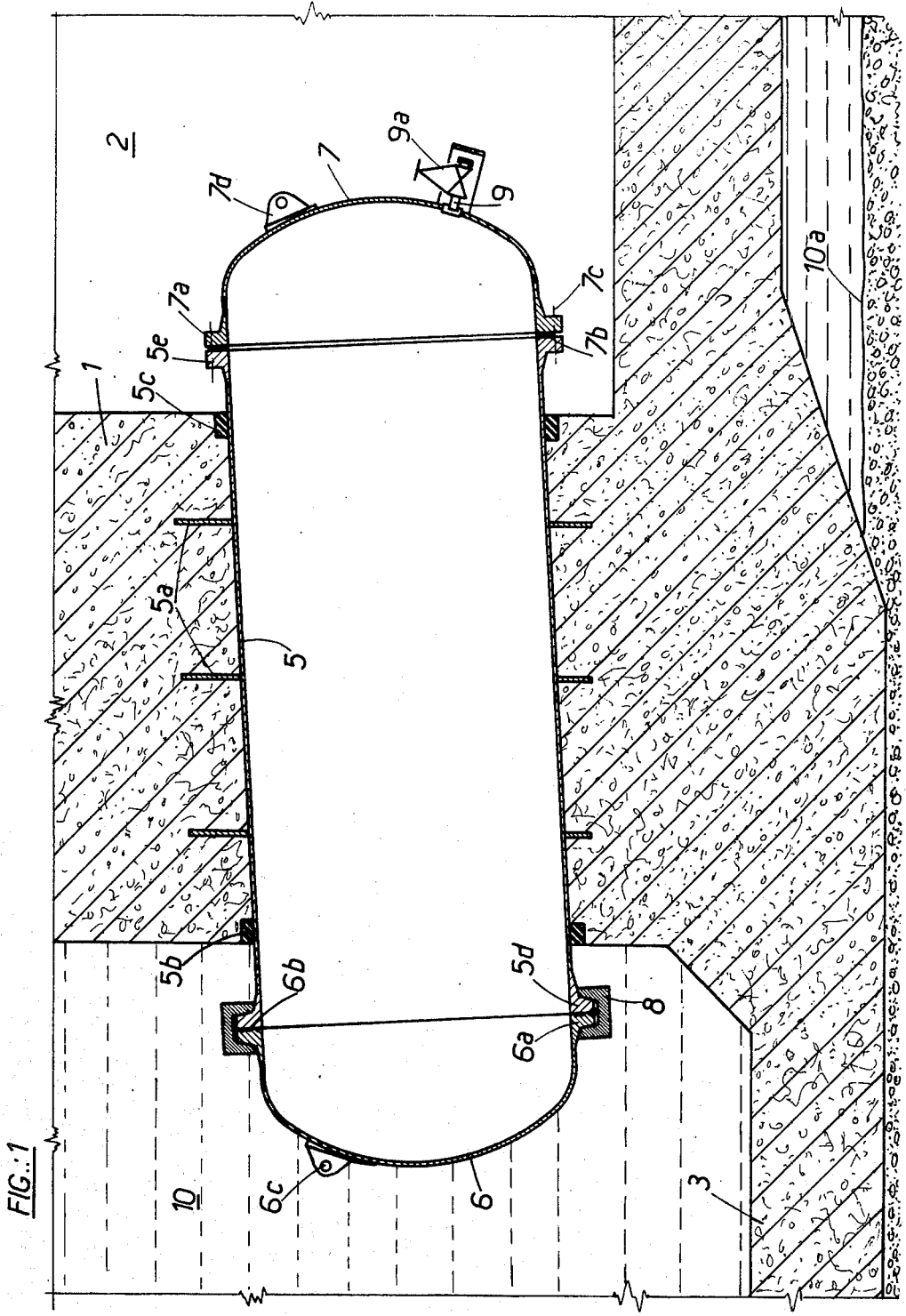
FIG. 1 is a sectional view of a concrete wall forming one wall of a chamber at atmospheric pressure, located on the sea bed and traversed by a tubular element closed off by two panels in order to form a watertight caisson.

In FIG. 1 there can be seen a concrete wall 1 which provides a watertight closure for the end of a tunnel 2 located in the base 3 which forms the foot of a tower (not shown) similar to that described in Patent Application already referred to. This tower consists of a strong watertight barrel (not shown) open to the atmosphere and communicating with several tunnels such as that 2 disposed radially in the base 3. The tunnel 2 is designed to receive the end of a pipeline (as shown at 4 in FIG. 2) for purposes of connection in the dry, with piping arrangements (not shown) arranged in the tower, thus enabling various operations to be carried out on the product which the pipeline is carrying, and also, possibly, enabling connections to be established with other pipelines (not shown) passing through other tunnels into the tower.

In the wall 1 at the time of construction of the tower, a watertight caisson comprising a tubular body 5 passing through the wall from one side to the other, has been installed, and two panels 6, 7 fitted to the two ends of said tubular body. The tubular body 5 is equipped externally with ribs 5a which are embedded in the concrete and the wall has been provided around said body, at the tunnel end and the external end, with two grooves 5b, 5c which have subsequently been filled with epoxy resin in order to establish a watertight seal between the tubular body 5 and the wall 1. The panel 6, located at the external end, possesses a flange 6a which is clamped against a flange 5d on the tubular body, with sealing rings 6b in between, by means of a split collar 8; the panel 6 is equipped externally with a lug 6c which enables it to be slung. The panel 7 is equipped with a flange 7a which is clamped against the flange 5e on the tubular body in order to trap between the two an elastic seal 7b, the clamping action being produced by bolts 7c. The panel 7 is also equipped with a lug 7b for attachment of a sling and contains a tube 9 closed off by a cock 9a which can be opened in order to equalize the pressures in the watertight caisson and tunnel 2.

When the tower is placed in position with its base resting upon the sea bed 10a, the tunnel remains at atmospheric pressure since it communicates with the open air through the barrel which has not been shown, so that the panel 6 is applied against the flange 5d by the pressure of the water 10, this in principle producing a perfectly watertight pressure differential closure. The external panel 7 is therefore provided purely by way of a precaution in order to prevent any risk of accidental flooding of the tunnel 2 with water in the event of the accidental failure of the external closure.

Figure 2:
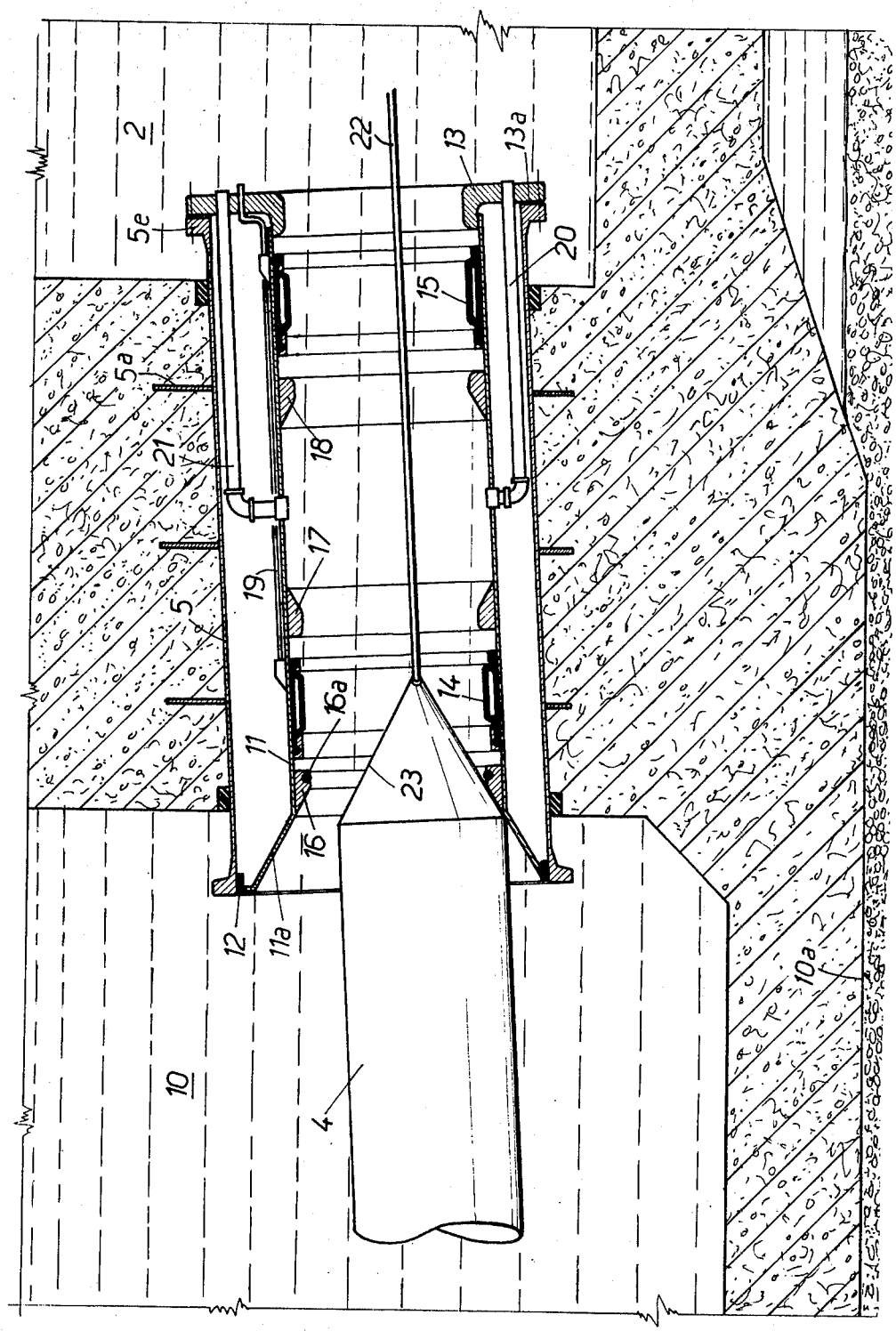
FIG. 2 is a view similar to that of FIG. 1 showing a sleeve fixed in the tubular element, and the end of a submarine pipeline which is in the process of being drawn into the chamber.
Figure 3:
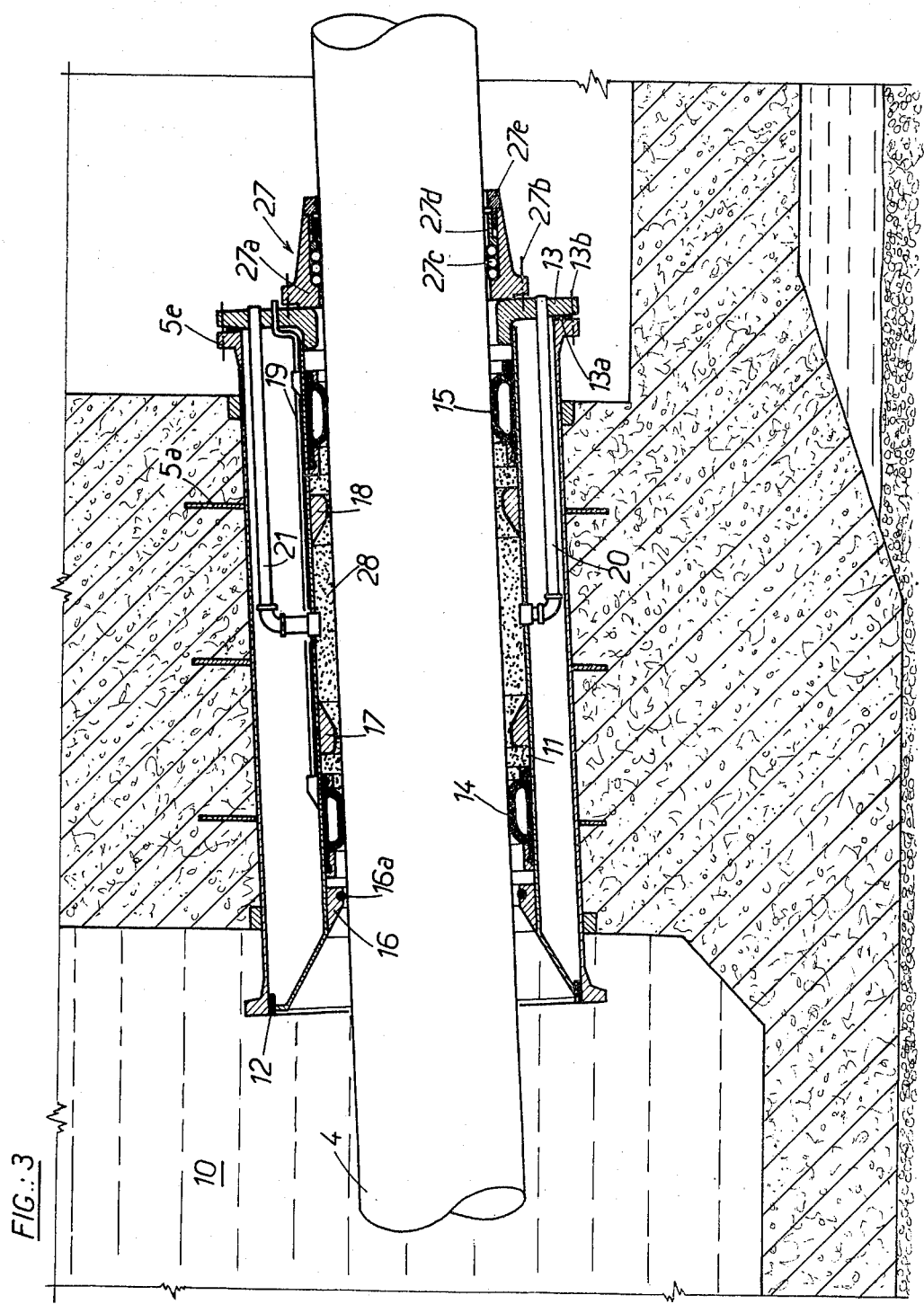
FIG. 3 is a view similar to that of FIG. 2 showing the condition of the device at the end of the operation.

At the time at which it is desired to introduce the end of a pipeline 4 into the tunnel 2, there is lowered into same, through the barrel which has not been shown, a sleeve 11 having an external dimension such that it can be inserted into the tubular body 5, as FIG. 2 shows, and an internal diameter suitable to receive the pipeline 4 as FIG. 3 shows. The precaution will have been taken to prepare in advance sleeves having internal diameters which match pipelines of various diameters so that it will be possible to stock and lower into the tunnel an appropriate sleeve as soon as the pipeline diameter is known. Then, the cock 9a is opened in order to ensure that equal pressures prevail in caisson and tunnel or in order to equalize these pressures if they are dissimilar, whereupon the bolts 7c are removed and the panel 7 is taken out of the tunnel, being lifted through the agency of its lug 7d.

Then the sleeve 11 can be engaged and fixed in the tubular body 5. The sleeve 11, to this end, is provided at that of its ends which is first introduced into the tubular body, with a ring 12 of an electrically insulating material having a diameter such that it can slide smoothly into the tubular body, its other end having a flange 13 which is capped against the flange 5e, with an electrically insulating seal 13a interposed between them, by bolts 13b each of which is surrounded by an insulating sheath and is provided with insulated washers beneath its head and the cooperating nut. The sleeve 11 is provided internally in the neighbourhood of its two ends, with two annular, inflatable seals 14, 15 which are protected by skids 16, 17, 18 and by a ring 16a, and can be inflated through the medium of a pipe 19 passing through the flange 13 and supplied from a compressed air source (not shown) situated in the open air at the top of the tower. The skids are distributed at angular intervals in the bore of the sleeve 11 and project radially inwards beyond the seals 14, 15 when the latter are in the deflated state (FIG. 2), down to a radius somewhat larger than that of the pipeline 4. The ring 16a links the tips of the skids 16. Between the skids 16 and the ring 12, the sleeve has a tapered entry 11a which is designed to act as a guide at the time of introduction of the pipeline, and this will be explained hereinafter. A pipe 20, extending from the tunnel 2 across the flange 13, opens into the bottom part of that section of the bore of the sleeve 11, which is disposed between the seals 13 and 14, and another pipe 21 extending from the top part of said bore section, opens into the tunnel across the flange 13.

When the sleeve 11 is in place in the tubular body 5, the crew are evacuated and the tunnel 2 is filled with water at the same pressure as the external water 10 (FIG. 2), for example by filling the tunnel and the barrel (not shown) with water by a pumping or syphoning operation, until sea level is reached. The sea water pressure then no longer acts upon the panel 6 and the latter can be removed; this operation is carried out by divers who separate the two halves of the split collar 8 in a manner known per se and hook the end of a cable to the lug 6c making it possible to raise the panel to the surface. The divers then pass through the sleeve 11 the end of a cable 22 which is wound on to a winch (not shown) arranged in the tunnel and attach this end of the cable to a conical traction head 23 fixed to the end of the pipeline 4. The winch (not shown) can be remote-controlled from the top of the tower and it is operated in order to slowly winch up the cable 22 and thus progressively draw the terminal portion of the pipeline 4 into the tunnel 2. When the end of the pipeline is resting on the sea bed 10a, the cable 22 passes over the ring 16a which prevents it from rubbing against the seals 14, 15 and damaging them, thereafter the traction head 23 and the pipeline end slide into the tapered entry 11a of the sleeve and over the skids 16, 17, 18, the latter in turn preventing any friction with the seals 14, 15 with the consequent possibility of damage.

As FIG. 4 shows, the cable 22 enters an anchoring device 24 with a tapered entry 24a also comprising a semicircular channel 25a (FIG. 5) formed in a concrete saddle 25 in the tunnel and aligned with the axis of the sleeve 11, and also possessing a plurality of half-collars 26 which can be fixed to said saddle 25 by means of nuts 26a screwed on to studs 26b embedded in the concrete. The nuts 26a are slacked off so that the half-collars 26 form in relation to the channel 25a a cylindrical passage through which the pipeline 4 can slide. The traction applied to the cable 22 by the winch (not shown) enables the traction head and the pipeline 4 to engage in the taper entry 24a and then in the cylindrical passage, and the winch is halted as soon as the pipeline end has passed the device 24 (position shown in FIG. 4). Then, the nuts 26a are tightened down so that that portion of the pipeline located in the tunnel 2 is held in position on the axis of the sleeve 11 and axially locked.

This done, the compressed air source (not shown) is set into operation in order to supply the pipe 19 and to inflate the seals 14, 15 (FIG. 3), thus temporarily sealing the clearance between the pipeline 2 and the sleeve 11 and making it possible to evacuate the water from the tunnel. To this end, the water is pumped out of the barrel (not shown) and the tunnel, in order to dry them out. Then, the nuts 26a are tightened down in order to clamp the end of the pipeline 4 between the half-collars 26 and the channel 25a and to thus position and lock it, whereupon the sealing is completed by the provision of a mechanically clamped safety seal 27 and by injecting epoxy resin into the annular space 28 between the pipeline 4 and that portion of the bore of the sleeve 11, which is located between the inflatable seals 14 and 15.

In the embodiment illustrated, the safety seal 27 is a gland-box or stuffing-box comprising a box 27a attached in watertight fashion to the flange 13 by means of bolts 27b, in which box a seal 27c is compressed by a screwed ring 27d held in position by a screwed cap 27e.

After the fitting of this safety seal 27, the annular space 28 is cleared of water by introducing compressed air into the pipe 21 so that the water and moisture are blasted out through the pipe 20 which is kept open, whereupon epoxy resin is injected through the pipe 20, keeping the pipe 21 open in order to completely fill the space 28 with resin. This adheres to the walls of the pipeline and the sleeve 11 and thus creates the final seal.

Then, around the pipeline 4 in proximity of the safety joint 27, a centering collar 29 (FIG. 4) is attached to the walls of the tunnel by rods 30 tensioned by means of turnbuckles 31, and the pipeline is cut at the point 32. The stresses applied to the pipeline by the cutting operation run no risk of damaging the seals 27 and 28 since the stresses are developed between two regions which are immobilised respectively by the device 24 and the collar 29. Then, the cut-off end of the pipeline is removed and the pipeline connected to a piping (not shown) which is positioned and secured in the device 24. Connection will advantageously be effected by means which electrically insulate the pipeline 4 from the piping which has not been shown. The pipeline can thus be given cathodic protection against electrolytic corrosion since it is electrically insulated from the said piping and the walls of the tunnel (by the elements 12 and 13a, FIG. 3).

Figure 3A:
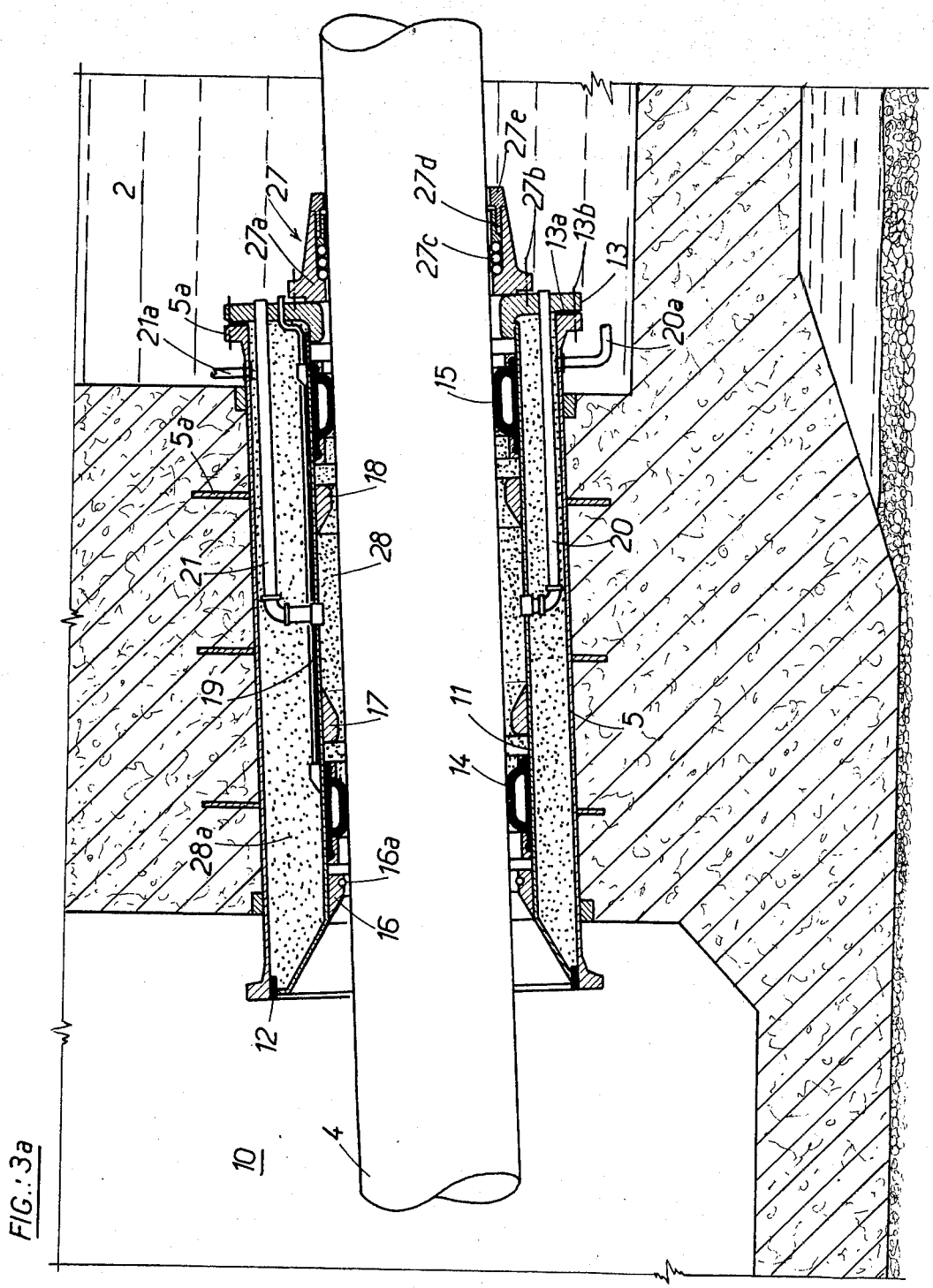
FIG. 3a is a view similar to that of FIG. 3, showing a modification.

FIG. 3a illustrates a modification in which the tubular body 5 is traversed by two pipes 20a and 21a opening respectively in proximity of its top and bottom generatrices. These two pipes terminate in the tunnel where they are closed off by screwed plugs (not shown).

The pipes 20a and 21a are used to inject epoxy resin into the annular space 28a defined between the tubular body 5 and the sleeve 11, in order to reinforce the seal around same. Preferably, this operation will be carried out after having engaged and fixed the sleeve in the tubular body and before flooding the tunnel 2. To this end, the screwed plugs are removed (they have not been shown in fact) and epoxy resin is injected through the pipe 20a whilst keeping the pipe 21a open in order to completely fill the space 28a with resin. The resin adheres to the walls of the sleeve 11 and of the tubular body 5 and reinforces the watertight seal. However, it is also possible to carry out injection after having dried out the tunnel; this will then advantageously be preceded by an operation which consists in blowing compressed air into the pipe 21a in order to displace moisture from the space 28a through the pipe 20a which is maintained open for the purpose.

FIG. 6 illustrates a modification in which, instead of directly attaching the safety joint to the flange 13 of the sleeve 11, it is fixed to one end of an expansion bellows 33 the other end of which is attached to said flange 13. The bellows 33 is externally protected by a cylindrical casing 33a and is attached to the flange 13 as soon as the latter has been fixed to the flange 5e of the tubular body 5, whereupon the tunnel 2 is flooded, the cover 6 removed, the pipeline introduced, the seals 14, 15 inflated and the tunnel dried out in the manner described in relation to the preceding figures. Then, the safety joint is attached to the free end of the bellows 33 and epoxy resin is injected at 28 in the manner already described. In the embodiment illustrated, the safety joint 34 is of the transverse clamping type, being produced by means of two split collars 34a, 34b provided internally with seals 34c and clamped together by bolts 34d.

This assembly is designed to enable the pipeline 4 to slide longitudinally in relation to the wall 1 and thus avoids any risk of failure of the pipeline in the event of minor displacements of the tower structure relatively to the sea bed. The anchoring device 24 is replaced by a simpler device 25 comprising a single collar 35a bolted to the saddle 25 and designed to position albeit not to lock, that portion of the pipeline which is located inside the tunnel as well as the piping (not shown) which is connected to the pipeline, that is to say in order to maintain them in alignment with the axis of the sleeve 11 whilst still allowing them to slide axially. In the event of any small sliding movement of the pipeline (some few centimeters), the seal at 28 retains its integrity, the epoxy resin being sufficiently elastic to be capable of deforming whilst continuing to adhere to the pipeline and to the sleeve 11. If the adhesion is destroyed by the occurrence of larger displacements, then the seal is guaranteed by the safety joint 33.

Figure 8:
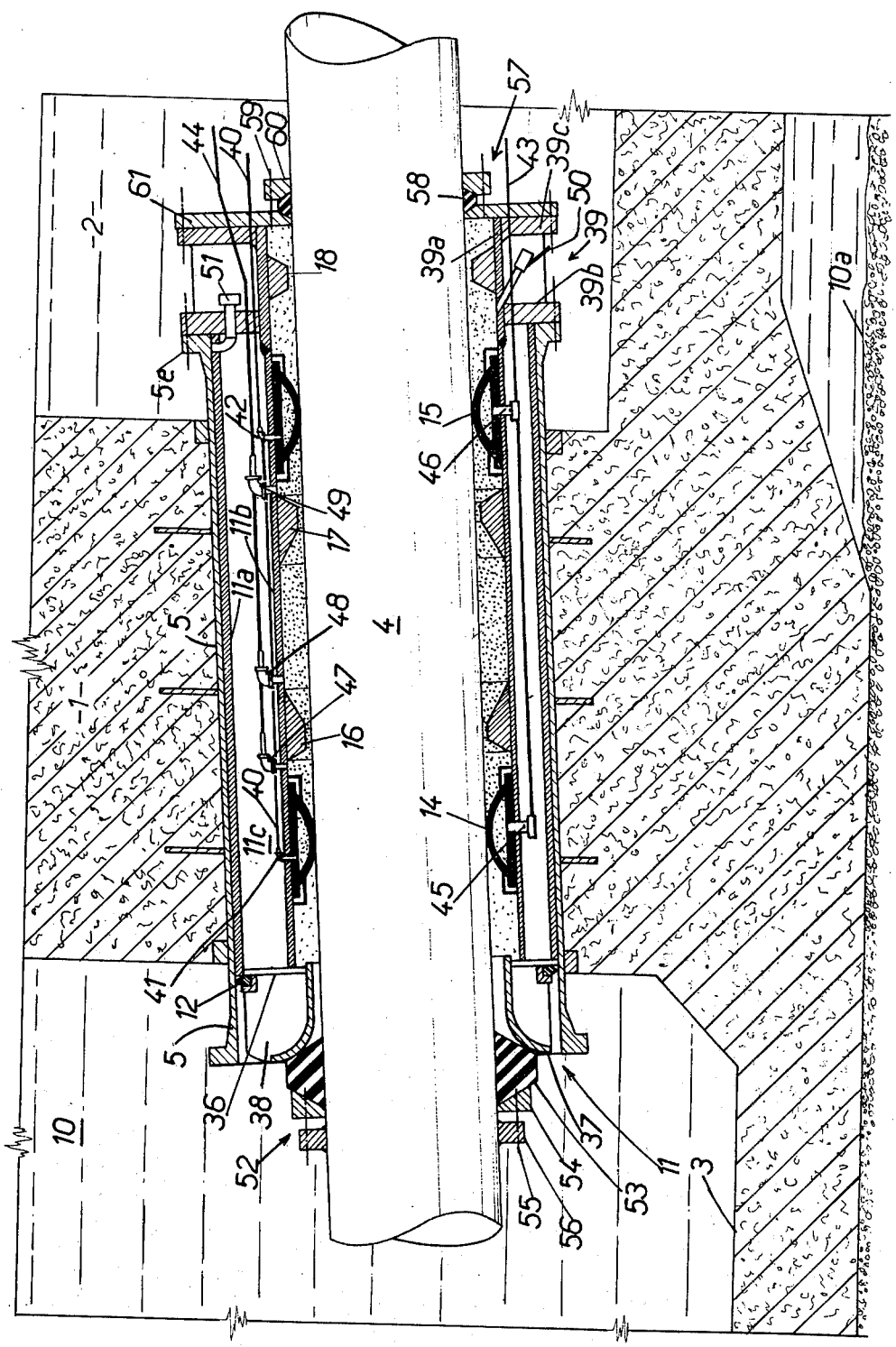
FIG. 8 is a view similar to that of FIG. 3, showing further modifications.

FIG. 8 shows further modifications in which the sleeve 11 has a cylindrical outer wall 11a which fits smoothly into the tubular body 5, and an inner wall 11b which bears the inflatble seals 14, 15 and the skids 16, 17, 18. At the outer end of sleeve 11, the walls 11a, 11b are connected with each other by a flange 36 which projects slightly beyond wall 11b towards the centerline of sleeve 11. The inner periphery of flange 36 is welded to an annular outwardly projecting member 37 which is bent away from the centerline. Projecting member 37 is braced by brackets 38 supported by flange 36. At their inner ends, i.e. the ends projecting in tunnel 2, the walls 11a, 11b are welded to an annular member 39 comprising a wall 39a which extends beyond wall 11b and supports the skids 18, a first flange 39b which projects outside beyond wall 11a, and a second flange 39c spaced from the first flange.

The inflatable seals 14, 15 can be inflated through a piping 40 which extends in tunnel 2 and in the inner annular space 11c of sleeve 11, and leads to connectors 41, 42 feeding the inflatable seals through wall 11b. In tunnel 2 and space 11c extend also an injection piping 43 for injection of epoxy resin through wall 11b, by means of connectors 45, 46 leading into the inflatable seals 14, 15 respectively, and a further injection piping 44 for injection of epoxy resin through wall 11b, by means of connectors 47, 48, 49 leading between inflatable seal 14 and skids 16, between skids 16 and 17, and between skids 17 and inflatable seal 15, respectively. A further connector 50 is provided in the spacing between flanges 39a and 39b for injection of epoxy resin through wall 11b in the space between the inflatable seal 15 and skids 18. A connector 51 is provided in the spacing for injection of epoxy resin through flange 39a and wall 11a, in the clearance between wall 11a and tubular body 5, near the inner end of the latter.

Insertion of sleeve 11 in tubular body 5 and introduction of the pipeline 4 into the tunnel through sleeve 11 are effected as described above. The flange 39b is clamped against the inner flange 5e of tubular body 5 with a seal (not shown) between the flanges, and the outer insulating ring 12 of sleeve 11 engages smoothly the tubular body. As soon as the pipeline has been introduced in the tunnel, divers place a pressure-differential safety seal 52 in position. Pressure-differential safety seal 30 comprises a ring formed of neoprene 53 engaged around pipeline 4 and clamped against the bent portion of projecting member 37 by a metal bushing 54 engaged by screws 55 co-operating with threaded holes in a ring 56 fastened to the pipeline.

Then, and only then, inflatable seals 14, 15 are inflated with compressed air as described above, and the tunnel 2 and hollow barrel (not shown) are dried out. Thus, the seal 52 is applied sealingly against the projecting member 37 by the pressure of the water 10. Then, epoxy resin is injected between the inflatable seals 14, 15 through piping 44 and connectors 47, 48, 49, between the inflatable seal 15 and skids 18 through connectors 50, into the inflatable seals 14, 15 through piping 43 and connectors 45, 46, and in the clearance between outer wall 11a of the sleeve and tubular member 5 through connector 51.

Then, a mechanically clampable seal 57 is placed in position inside the tunnel. Seal 57 comprises a ring formed of neoprene 58 which is clamped by screws 59 between a metal bushing 60 and a flange 61 which in turn is clamped against flange 39c with a seal (not shown) therebetween.

It goes without saying that the embodiments described are purely examples and are open to modification, in particular by the substitution of equivalent techniques, without in so doing departing from the scope of the invention. In particular, instead of electrically insulating the sleeve 11 from the tubular body 5, it is possible to electrically insulate the latter from the wall 1, for example by coating its external surface and its ribs with epoxy resin, before embedding it in the concrete.

I claim:

1. A method of executing the transition of a duct across a wall between a first space in which a first pressure prevails and a second space normally subjected to a second pressure differing from the first pressure, comprising the steps of: forming a passage across the wall, mounting a pair of annular inflatable seals in axially spaced relation in the passage temporarily closing the passage by a pressure-differential method which utilises the difference between the first pressure and the second pressure, subjecting the second space to the first pressure, re-opening the passage, passing the duct through the passage, temporarily sealing the passage around the duct by inflating the inflatable seals, restoring the second pressure in the second space, and finally sealing the passage around the duct by injecting an adhesive cement between the inflatable seals and into the inflatable seals.

2. A device intended to establish a transition for a duct across a wall between a first space in which a first pressure prevails and a second space normally at a second pressure differing from the first, comprising means forming a passage across said wall and including a peripheral rim facing that of said spaces which is normally at the higher pressure, a temporary closure means and means for placing same against the peripheral rim in such a fashion that the temporary closure means is applied against said rim by said higher pressure in order to close off the passage, a pair of annular inflatable seals arranged in axially spaced relation in the passage, means for filling the second space with a fluid at a pressure substantially equal to the first pressure in order to make it possible to remove the temporary closure means, means for removing same, means for introducing the duct through the passage and the annular inflatable seals, means for inflating the inflatable seals to seal the passage around the duct temporarily, the infatable seals in the inflatable state defining an annular chamber extending therebetween around the duct, means for evacuating the fluid from the second space, and means for finally sealing the passage around the duct, said final sealing means comprising means for drying out the annular chamber, means for injecting an adhesive cement in the annular chamber, and means for injecting an adhesive cement into the inflatable seals.

3. A device as claimed in claim 2, wherein said space which is normally at the higher pressure is the first space, further comprising a mechanically clampable seal comprising an annular member formed of an elastomeric material, a first annular rigid member means fastening the first rigid member sealingly to an end surface of the passage facing the second space, a second annular rigid member, and means for clamping said elastomeric member between said rigid members to further seal the passage around the duct.

4. A method of executing the transition of a duct across a wall between a first space in which a first pressure prevails and a second space normally subjected to a second pressure smaller than the first pressure, comprising the steps of: forming a passage across the wall, temporarily closing the passage by a pressure-differential method which utilises the difference between the first pressure and the second pressure, subjecting the second space to the first pressure, re-opening the passage, passing the duct through the passage, temporarily sealing the passage around the duct, restoring the second pressure in the second space, and finally sealing the passage around the duct, the temporary sealing step comprising sealing the passage around the duct adjacent the first space by a pressure-differential method which utilises the difference between the first pressure and the pressure in the passage.

5. A device intended to establish a transition for a duct across a wall between a first space in which a first pressure prevails and a second space normally at a second pressure differing from the first pressure, comprising means forming a passage across said wall and including a peripheral rim facing that of said spaces which is normally at the higher pressure, a temporary closure means and means for placing same against the peripheral rim in such a fashion that the temporary closure means is applied against said rim by said higher pressure in order to close off the passage, at least one annular seal arranged in the passage, means for filling the second space with a fluid at a pressure substantially equal to the first pressure in order to make it possible to remove the temporary closure means, means for removing same, means for introducing the duct through the passage and the annular seal, an annular safety seal around the duct, and means for placing same against an end surface of the passage adjacent said peripheral rim in such a fashion that the safety seal is applied against said end surface by said higher pressure in order to seal the passage around the duct, means for clamping the annular seal against the duct, means for evacuating the fluid from the second space, and means for finally sealing the passage around the duct.

6. A device as claimed in claim 5, wherein the safety seal comprises an annular member formed of an elastomeric material, and a rigid member.

7. A device as claimed in claim 6, wherein the rigid member is formed of a metal.

8. A device as claimed in claim 4, wherein said space which is normally at the higher pressure is the first space, further comprising a mechanically clampable seal comprising an annular member formed of an elastomeric material, a first annular rigid member, means fastening the first rigid member sealingly to an end surface of the passage facing the second space, a second annular rigid member, and means for clamping said elastomeric member between said rigid members to further seal the passage around the duct.

* * * * *